United States Patent
Pannuzzo et al.

(10) Patent No.: US 10,273,857 B2
(45) Date of Patent: Apr. 30, 2019

(54) METHOD AND APPARATUS FOR MONITORING A PARTICULATE FILTER

(71) Applicant: GM GLOBAL TECHNOLOGY OPERATIONS LLC, Detroit, MI (US)

(72) Inventors: Andrea Pannuzzo, Piemonte (IT); Andrea Dutto, Turin (IT); Adele De Domenico, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 181 days.

(21) Appl. No.: 15/407,292

(22) Filed: Jan. 17, 2017

(65) Prior Publication Data

US 2018/0202342 A1  Jul. 19, 2018

(51) Int. Cl.
*F01N 9/00* (2006.01)
*F01N 11/00* (2006.01)
*F01N 3/023* (2006.01)

(52) U.S. Cl.
CPC ............ *F01N 9/002* (2013.01); *F01N 3/023* (2013.01); *F01N 11/002* (2013.01); *F01N 2430/00* (2013.01); *F01N 2550/04* (2013.01); *F01N 2560/08* (2013.01); *F01N 2900/1602* (2013.01); *F01N 2900/1606* (2013.01); *Y02T 10/47* (2013.01)

(58) Field of Classification Search
CPC ..... F01N 9/002; F01N 11/002; F01N 2550/04
See application file for complete search history.

(56) References Cited

U.S. PATENT DOCUMENTS 8,214,135 B2 * 7/2012 Nevin ................... F02D 41/029
60/277
2014/0157982 A1 * 6/2014 Ardanese ........... B01D 46/0063
95/20

* cited by examiner

*Primary Examiner* — Thai Ba Trieu
*Assistant Examiner* — Diem T Tran
(74) *Attorney, Agent, or Firm* — Quinn IP Law (57) ABSTRACT

A method for monitoring particulate filter disposed in an exhaust aftertreatment system of an internal combustion engine includes determining, via a differential pressure sensor, a pressure differential across the particulate filter, and determining an initial parameter associated with soot loading on the particulate filter based upon the pressure differential. A first adjustment to the soot loading is determined based upon a passive regeneration effect, a second adjustment to the soot loading is determined based upon an off-engine temperature effect, and a third adjustment to the soot loading is determined based upon occurrence of an interrupted regeneration event. A final parameter associated with soot loading on the particulate filter is determined based upon the initial parameter and the first, second and third adjustments.

16 Claims, 4 Drawing Sheets

METHOD AND APPARATUS FOR MONITORING A PARTICULATE FILTER

INTRODUCTION

Particulate filters are employed in engine exhaust aftertreatment systems to remove particulate matter from an exhaust gas feedstream.

SUMMARY

A particulate filter disposed in an exhaust aftertreatment system of an internal combustion engine is described. A method for monitoring the particulate filter includes determining, via a differential pressure sensor, a pressure differential across the particulate filter, and determining an initial parameter associated with soot loading on the particulate filter based upon the pressure differential. A first adjustment to the soot loading is determined based upon a passive regeneration effect, a second adjustment to the soot loading is determined based upon an off-engine temperature effect, and a third adjustment to the soot loading is determined based upon occurrence of an interrupted regeneration event. A final parameter associated with soot loading on the particulate filter is determined based upon the initial parameter and the first, second and third adjustments.

An aspect of the disclosure includes controlling, via an engine controller, a regeneration event for the particulate filter based upon the final adjusted soot loading.

Another aspect of the disclosure includes controlling the internal combustion engine to execute auto-regeneration when the final parameter associated with soot loading is less than a soot load capacity threshold.

Another aspect of the disclosure includes controlling the internal combustion engine to execute service regeneration when the final parameter associated with soot loading is greater than a soot load capacity threshold.

Another aspect of the disclosure includes controlling the internal combustion engine to execute vehicle service to replace particulate filter when the final parameter associated with soot loading is greater than an overloaded soot loading level.

Another aspect of the disclosure includes monitoring engine operation to determine a magnitude of NOx emissions and temperature of the particulate filter, and determining the first adjustment based thereon.

Another aspect of the disclosure includes monitoring an engine soak time and engine temperature, and determining the second adjustment based thereon.

Another aspect of the disclosure includes monitoring operation for occurrence of an interrupted regeneration event, determining a soot loading level in relation to a pressure differential associated with an interrupted regeneration event, and determining the third adjustment based thereon.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms may be used with respect to the drawings. As employed herein, the term "upstream" and related terms refer to elements that are towards an origination of a flow stream relative to an indicated location, and the term "downstream" and related terms refer to elements that are away from an origination of a flow stream relative to an indicated location. These and similar directional terms are not to be construed to limit the scope of the disclosure. Furthermore, the disclosure, as illustrated and described herein, may be practiced in the absence of an element which is not specifically disclosed herein.

Figure 1:
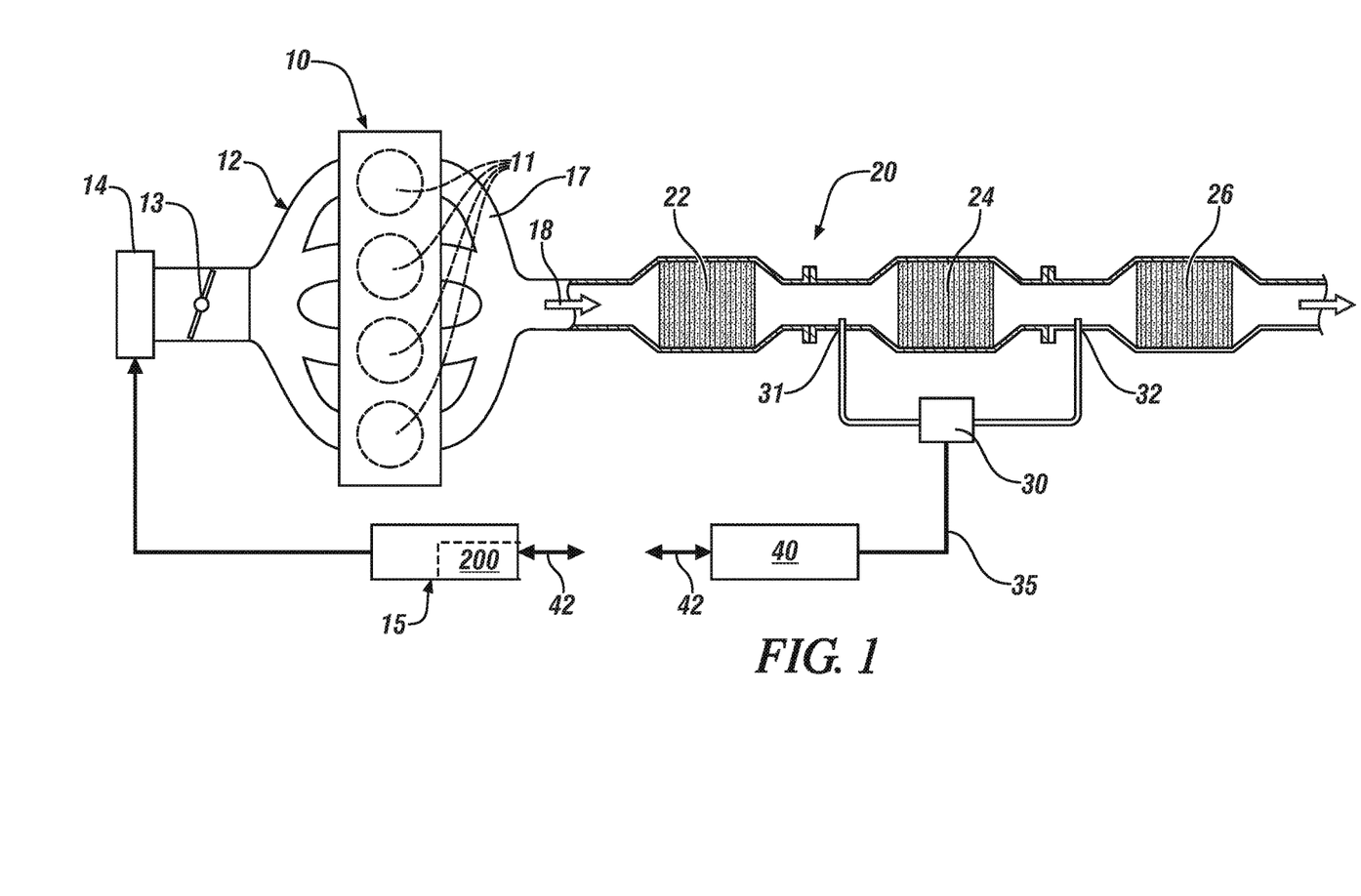
FIG. 1 schematically illustrates an internal combustion engine, exhaust aftertreatment system and controller that may be disposed to provide propulsion power to a vehicle, in accordance with the disclosure.

Referring to the drawings, wherein like reference numerals correspond to like or similar components throughout the several Figures, FIG. 1, consistent with embodiments disclosed herein, schematically illustrates an internal combustion engine (engine) 10 and associated exhaust aftertreatment system 20 that may be disposed to provide propulsion power to a vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The engine 10 includes an engine block that defines a plurality of cylinders 11 that incorporate movable, reciprocating pistons. An intake manifold 12 is disposed to channel intake air to the cylinders 11, and a mass airflow meter 14 is disposed upstream of a throttle 13. The mass airflow meter 14 and the throttle 13 are in communication with a controller 15, which is disposed to monitor signal inputs from the mass airflow meter 14 and communicate commands to the throttle 13 and other engine actuators in response to operator and other system demands. An exhaust manifold 17 is disposed to entrain exhaust gases expelled by the engine 10, which are channeled as an exhaust gas feedstream 18 to the exhaust aftertreatment system 20.

The exhaust aftertreatment system 20 is disposed to include a plurality of exhaust purifying devices, including, by way of a non-limiting example, first, second and third devices 22, 24 and 26, respectively, wherein the second device is configured as a particulate filter. The first and third devices 22, 26 may be a suitable exhaust purifying devices that are disposed to oxidize, reduce or otherwise treat the exhaust gas feedstream 18 to purify it. A pressure monitoring device 30 is disposed to monitor exhaust pressure, and is preferably disposed to monitor a pressure differential 35 across the particulate filter 24 as shown. The pressure monitoring device 30 is configured as a pressure differential sensor in one embodiment that is fluidly coupled to a first inlet 31 in the exhaust gas feedstream 18 that is located upstream of the particulate filter 24 and fluidly coupled to a second inlet 32 in the exhaust gas feedstream 18 that is located downstream of the particulate filter 24. The pressure monitoring device 30 generates an electrical signal that can be correlated to the pressure differential 35 between the first and second inlets 31, 32, which is communicated to a controller 40. The pressure monitoring device 30 described herein is one embodiment of a mechanization to determine the pressure differential 35 across all of or a subset of the devices of the exhaust aftertreatment system 20. Alternatively, two pressure sensors may be disposed to measure the pressures of the exhaust gas feedstream at the first and second inlets 31, 32, with the pressure differential 35 being determined in the controller 40 based upon a difference thereof.

The particulate filter 24 is configured to mechanically remove, i.e., filter particulate matter that is a byproduct of combustion that is contained in the exhaust gas feedstream 18. In one embodiment the particulate filter 24 is a wall flow device that includes a monolithic cordierite substrate that may be composed from porous ceramic material and include a multiplicity of flow channels that are oriented parallel to a direction of flow of the exhaust gas feedstream 18 between an upstream location and a downstream location relative to the particulate filter 24. In one embodiment, the ceramic substrate in the form of a monolithic cordierite substrate having a cell density in a range 31 to 62 cells per square centimeter (200-400 cells per square inch) with a wall thickness of three to seven mils. The channels are each plugged either at an upstream end or a downstream end, with alternating ones of the channels being plugged at opposite ends. The walls of the substrate have high porosity, e.g., about 55% porosity or higher with a mean pore size of about 25 microns to permit flow of exhaust gases to entrap particulate matter in the exhaust gas feedstream 18. Other suitable substrates may be employed to trap, oxidize, and otherwise manage particulate matter produced during combustion. The walls of the substrate may be impregnated with a catalytically active washcoat for oxidizing unburned hydrocarbons that are contained in the exhaust gas feedstream in one embodiment. The washcoat may include suitable catalytically active materials, e.g., platinum-group metals including Pt, Pd, and Rh, and additives including, e.g., Ce, Zr, La, at densities and ratios sufficient to effect oxidation of the unburned HCs and perform other operations such as oxygen storage for diagnostic evaluations.

The particulate filter 24 is configured to collect liquid and solid particles in the porous substrate structure while allowing exhaust gases to flow through. As it reaches its nominal storage capacity, the trapped particles need to be removed by a process called regeneration, during which the exhaust gas temperature is increased to create a condition whereby the particulate matter, i.e., soot is oxidized. Details related to execution of a regeneration process are specific to the configuration and operation of the engine 10 and the exhaust aftertreatment system 20.

In operation, unwanted effects may occur as the particulate filter 24 captures and accumulates particulate matter. The unwanted effects may include an increase in exhaust back-pressure and a potential for exothermic reactions in the particulate filter 24. The increase in backpressure may affect engine performance. The exothermic reactions in the particulate filter 24 may cause exhaust gas temperatures that may lead to unwanted heat transfer, which may affect service life of the particulate filter 24 and/or other on-vehicle components.

A soot storage level in the particulate filter 24 may be measured or estimated employing various models and on-board sensors that monitor engine operating parameters to determine a magnitude of soot being generated by the engine 10 and to determine the amount of soot that is burned, trapped or passes through the particulate filter 24 and other exhaust aftertreatment devices. In one embodiment, the primary device employed to estimate soot level is the pressure monitoring device 30, which generates a signal that may be normalized through exhaust flow to determine a state variable that correlates to accumulated soot in the particulate filter 24. However, correlation between the differential pressure and the magnitude of accumulated soot can be affected by operating conditions that can alter the distribution of soot inside the filter, including passive regeneration of the particulate filter and the effect of NOx emissions and temperature of the particulate filter 24, incomplete regeneration events, and effect of time and temperature of the engine 10 during an engine-off period.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link, and is indicated by lines 42. Communication includes exchanging data signals in suitable form, including, for example, electrical signals via a conductive medium, electromagnetic signals via air, optical signals via optical waveguides, and the like. The data signals may include discrete, analog or digitized analog electrical signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. A parameter is defined as a measurable quantity that represents a physical property of a device or other element that is discernible using one or more sensors and/or a physical model that generates a data signal, wherein the data signal is associated with a state of the parameter. The state of a parameter can have a discrete value, e.g., either "1" or "0", or can be infinitely variable in value over a range. When employed for interpreting a data signal, the terms "calibration", "calibrate", and related terms refer to a result or a process that can be employed to derive an actual or standard state of a parameter from a data signal that represents an observed measurement. By way of a non-limiting example, a calibration can be developed and employed to determine a pressure differential based upon an electrical signal that is output from a differential pressure sensor. A calibration as described herein can be reduced to a storable parametric table, a plurality of executable equations or another suitable form.

Figure 2:
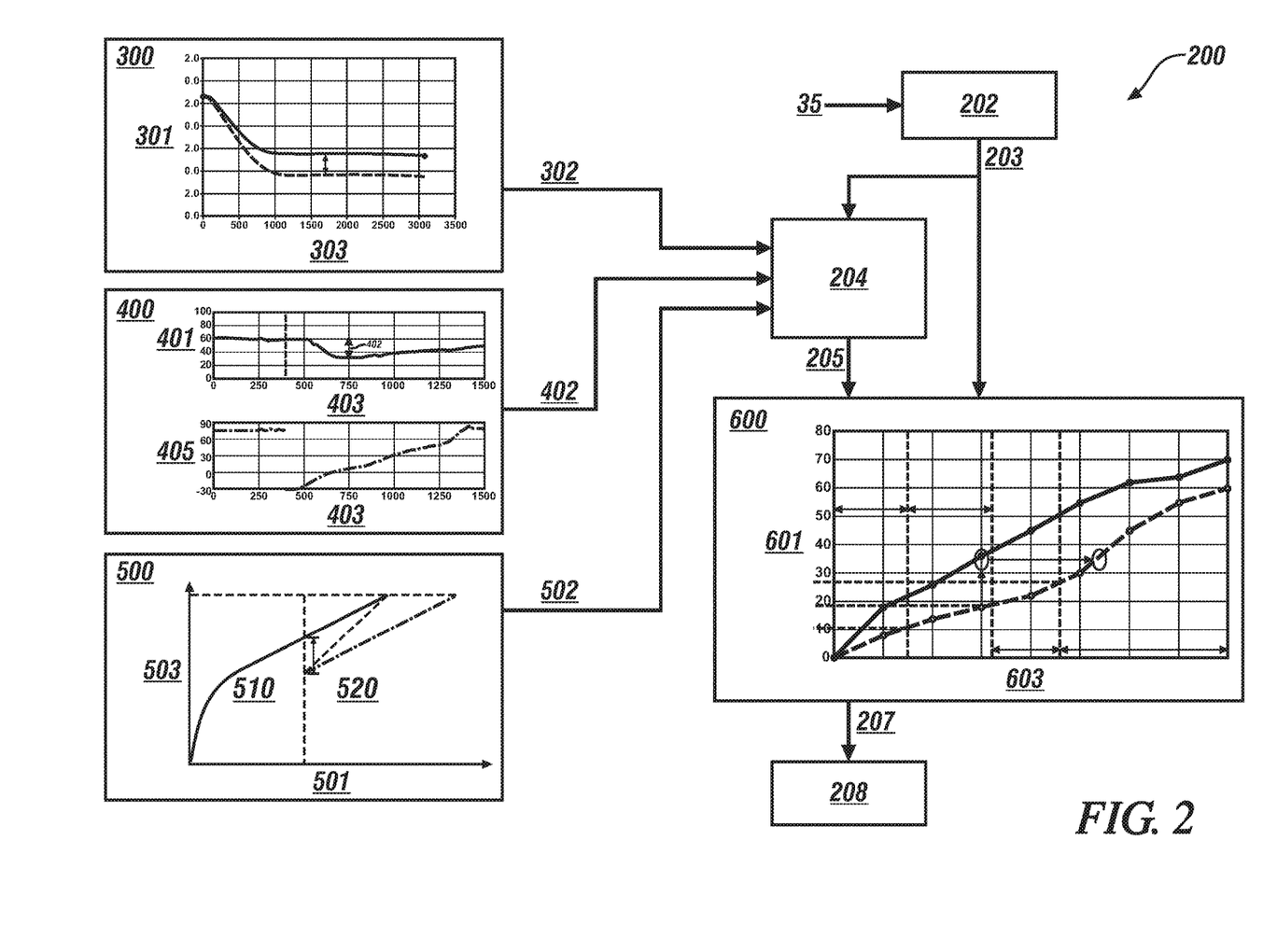
FIG. 2 schematically shows a method for monitoring soot loading on a particulate filter employed in an exhaust aftertreatment system of an internal combustion engine, in accordance with the disclosure.

FIG. 2 schematically shows a method 200 for monitoring soot loading on a particulate filter, and is described with reference to an embodiment of the internal combustion engine 10, exhaust aftertreatment system 20 and controller 15 that are described with reference to FIG. 1. The method 200 is described in terms of functional and/or logical block components and/or various processing steps. It should be realized that such block components may be composed hardware, software, and/or firmware components configured to perform the specified functions. The steps of the method 200 may be executed in a suitable order, and are not limited to the order shown with reference to FIG. 3, nor are they necessarily executed sequentially or chronologically. The various steps shown in the flowchart diagram may occur in a suitable order, and some of the steps may be performed concurrently or not at all.

During engine operation, a pressure differential 35 across the particulate filter 24 is periodically monitored via the differential pressure sensor 30, and input to a delta pressure model 202. The delta pressure model 202 determines an initial soot loading 203 for the particulate filter 24 based upon the pressure differential and an associated flow resistance. Flow resistance describes properties that interfere with the free flow of a fluid, e.g., exhaust gas, in a constrained environment, such as in a pipe of an exhaust aftertreatment system. Flow resistance can be caused by boundary conditions between the walls of the pipe and the exhaust gas. Flow resistance can also be caused by obstructions in the flow channel, such as may be caused by the particulate filter 24, which may be characterized in terms of a magnitude of flow resistance. As such, when the magnitude of flow resistance during engine operation is greater than or less than a characteristic flow resistance for the device, it may provide an indication of a change in circumstances in the exhaust aftertreatment system that may need to be addressed, such as achieving a magnitude of soot loading that requires some form of active regeneration. The flow resistance of a specific component can be calculated as follows:

$$R = \Delta p / \dot{V} \quad [1]$$

wherein:
R is the flow resistance,
Δp is a pressure differential across the device, and
$\dot{V}$ is a volumetric flowrate.

Figure 6:
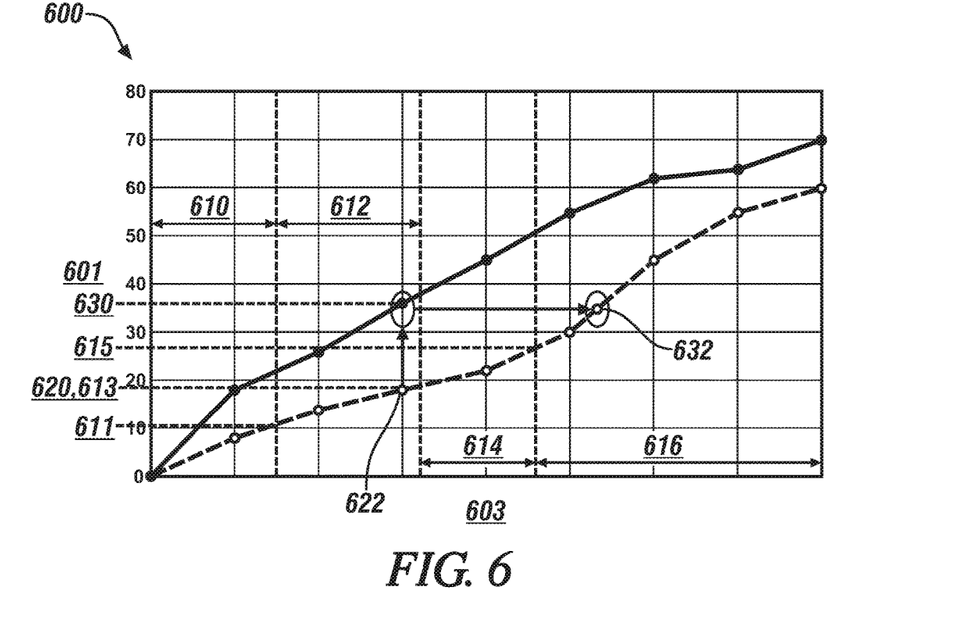
FIG. 6 graphically shows an initial soot loading and a corresponding final soot loading on a particulate filter, and further indicates a plurality of soot loading levels and associated regeneration modes that can be selected based upon the soot loading, in accordance with the disclosure.

The flow resistance R can be determined based upon the volumetric flowrate and the pressure differential, both which can be dynamically monitored during engine operation. In one embodiment, the volumetric flowrate can be derived based upon data signals that are input from the mass airflow meter 14, a fuel injection flowrate, exhaust temperature and exhaust pressure, while taking into account transport lag through the engine 10. In one embodiment, the pressure differential 35 is derived based upon data signals that are input from the pressure monitoring device 30 and correlated to the state of the pressure differential parameter. As such, the pressure differential 35 can be used to determine the flow resistance R, which can be evaluated to determine the initial soot loading 203 that is associated with the particulate filter 24. FIG. 6 includes line 620, which indicates an initial magnitude of soot loading that can be determined based upon the flow resistance.

A first adjustment 302 to the soot loading can be determined based upon a passive regeneration effect (300), which is described with reference to FIG. 3. The first adjustment 302 includes a parameter correction, e.g., to the soot loading, the pressure differential, or the flow resistance, which is determined based upon effect of the exhaust gas feedstream, particularly a magnitude of NOx emissions and temperature of the particulate filter 24 as related to passive regeneration of the particulate filter 24.

A second adjustment 402 to the pressure differential can be determined based upon engine soak times and temperatures (400), which is described with reference to FIG. 4. The second adjustment 402 includes a parameter correction, e.g., to the pressure differential or alternatively to the flow resistance, that is determined based upon effect of time and temperature of the engine 10 during an engine-off period.

A third adjustment 502 to the pressure differential can be determined based upon occurrence of an interrupted regeneration event (500), which is described with reference to FIG. 5. The third adjustment 502 includes a parameter correction, e.g., to the pressure differential or alternatively to the flow resistance, that is based upon effect of an incomplete regeneration event, when an incomplete regeneration occurs or recurs.

The first, second and third adjustments 302, 402 and 502 are combined (step 204) with the initial soot loading 203 that is associated with the particulate filter 24 that is determined based upon the flow resistance R to determine a final parameter 205 that is associated with actual soot loading on the particulate filter 24.

The final parameter 205 associated with the actual soot loading on the particulate filter 24 is evaluated to determine a preferred regeneration mode 207 (step 600), which is described with reference to FIG. 6. The preferred regeneration mode 207 is communicated to the engine controller 15 to command operation of the engine 10 and/or communicate with the vehicle operator (step 208) to convey a course of action for particulate filter regeneration.

Figure 3:
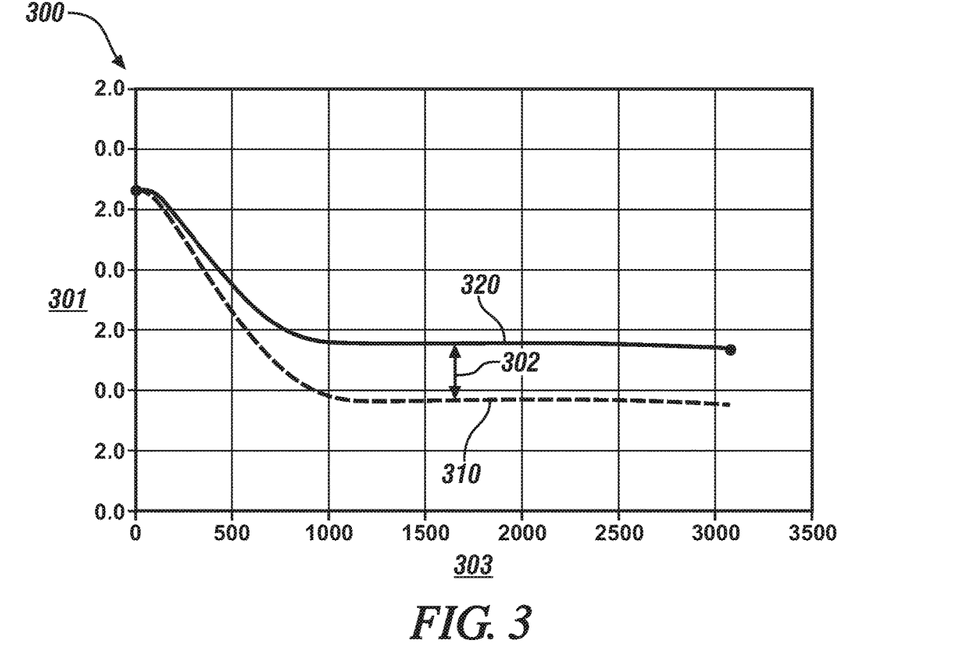
FIG. 3 graphically shows an effect of the exhaust gas feedstream, particularly a magnitude of NOx emissions and temperature, on soot loading on a particulate filter that is employed in an exhaust aftertreatment system of an internal combustion engine, in accordance with the disclosure.

FIG. 3 graphically shows soot loading 301 in relation to engine operating time 303, for an embodiment of engine 10 and the particulate filter 24 that are described with reference to FIG. 1, from which the first adjustment 302 can be determined. The graph shows the effect of passive regeneration of the particulate filter 24 and resulting soot loading under two different engine operating conditions, including soot loading at nominal engine operating conditions 310 and soot loading at engine operating conditions that predominantly include high NOx conditions and high temperature in the particulate filter 24, such as may occur under high-speed/high-load conditions, and is indicated by line 320. The first adjustment 302 may be determined based upon a difference therebetween. Passive regeneration of the particulate filter 24 refers to engine operating conditions that include high NOx levels and high DPF inlet temperatures in the exhaust gas feedstream 18 during which the soot reacts with NO2 in the exhaust gas feedstream resulting in an auto-burning condition. Under such conditions, the actual amount of oxidized soot is less than the amount of deposited soot. A high value for the pressure drop 35 is observed, which causes the delta pressure model 202 to overestimate the amount of soot that is deposited on the particulate filter 24. To correct this error, a model, in the form of an equation or predetermined calibration table, can be employed to calculate the actual soot level. The compensation is based on a predetermined map that provides a magnitude for the first adjustment 302 in relation to the NOx mass flow and temperature of the DPF.

Figure 4:
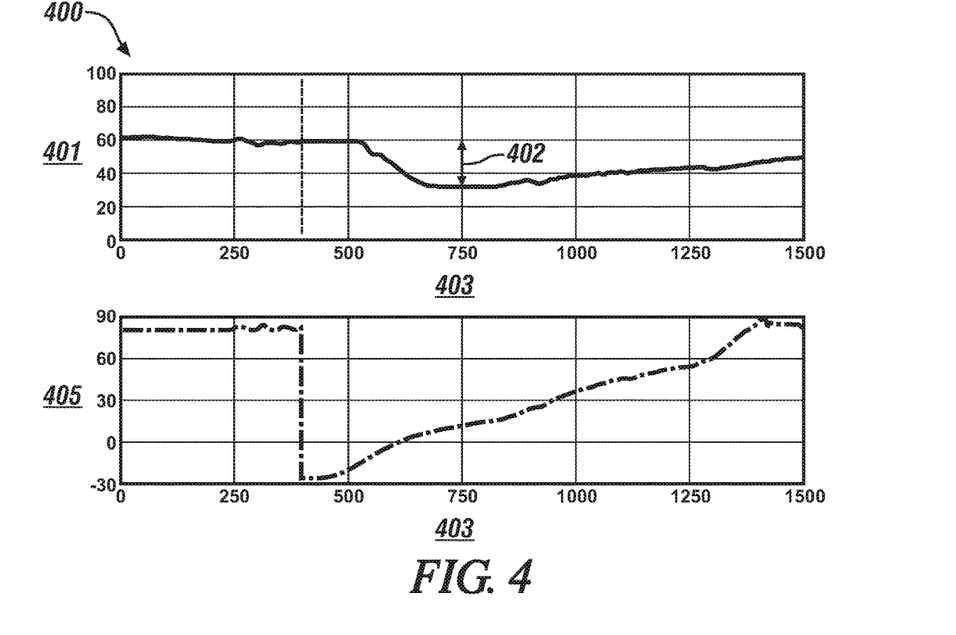
FIG. 4 graphically shows an effect of engine soak times and temperatures on the soot loading of a particulate filter that is employed in an exhaust aftertreatment system of an internal combustion engine, in accordance with the disclosure.

FIG. 4 graphically shows particulate filter loading 401 and engine coolant temperature 405 in relation to time 403, and provides an indication of the effect of engine soak times and temperatures on soot loading of the particulate filter 24. The estimated soot loading can be underestimated after an extended cold soak (engine off) at low ambient temperatures (around 10° C.). Under such conditions, the soot inside particulate filter 24 may change its permeability properties. A drop in the pressure differential may be observed and, consequently, a drop in flow resistance in comparison with flow resistance before the beginning of the cold soak period. Such a result causes an underestimation of the actual soot level in the particulate filter 24. When a parking effect is recognized, the second adjustment 402 can be determined to fill the gap between the actual soot level and the estimated soot level. The second adjustment 402 is a form of compensation that is calculated in relation to previous and actual flow resistance and DPF temperature and is applied for calibratable time. This can be related to overnight parking or extending parking events that cause an underestimation of the initial soot loading 203 as it relates to the differential pressure 35.

Figure 5:
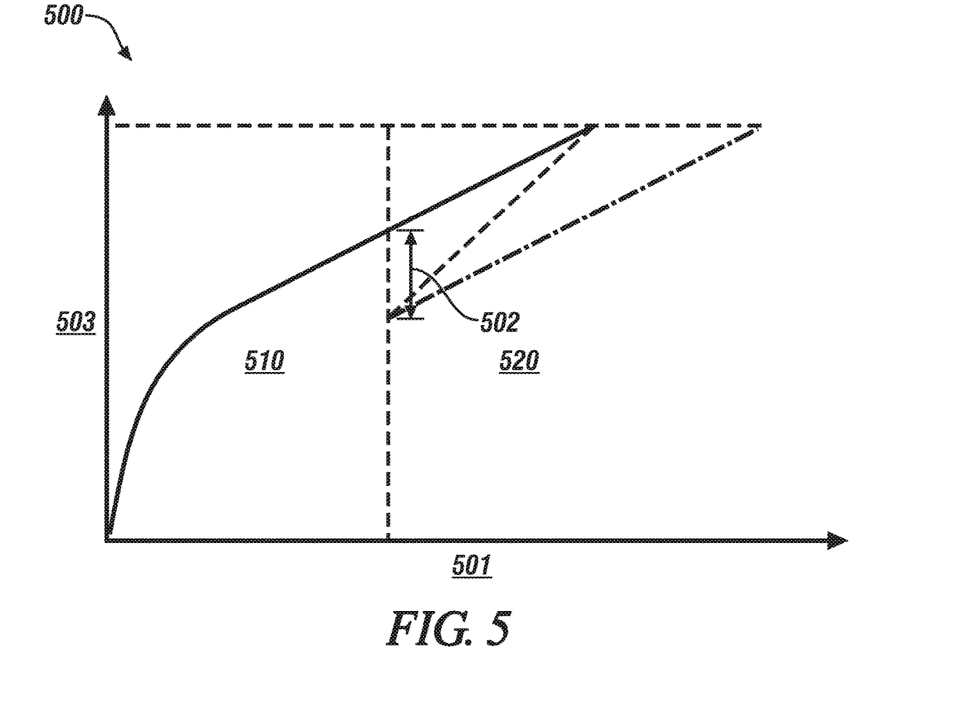
FIG. 5 graphically shows an effect of occurrence of an incomplete regeneration event on the soot loading of a particulate filter that is employed in an exhaust aftertreatment system of an internal combustion engine, in accordance with the disclosure.

FIG. 5 graphically shows particulate filter loading 501 in relation to pressure differential 503, and provides an indication of the effect of occurrence of an incomplete regeneration event. The results include a first line 510 that indicates soot loading in relation to pressure differential for a completed regeneration event and a second line 520 that indicates soot loading in relation to pressure differential for an interrupted regeneration event. The results graphically depict an underestimation of actual soot loading in the particulate filter 24. When regeneration events are interrupted or of shortened duration, a redistribution of the soot in the particulate filter 24 can occur. A one-dimensional kinetic soot model can be employed to compensate for the estimation error associated with delta pressure model 202 and determine the third adjustment 502 to the loading. The one-dimensional kinetic soot model evaluates, through modeling of the thermo-kinetic reactions, the soot rate burned during the regeneration events. The one-dimensional kinetic soot model then calculates the residual soot present within the particulate filter 24 at the end of each regeneration event, wherein such information can be used to correct and/or initialize the delta pressure model 202.

FIG. 6 graphically shows soot loading 601 on particulate filter 24 in relation to time 603, and indicates a plurality of soot loading levels 611, 613, and 615 and regeneration modes 610, 612, 614 and 616 that can be selected based upon the soot loading 601. When the soot loading level is less than a low soot loading level 611, it indicates that the particulate filter 24 is in a clean state, with minimal or no need to execute a regeneration event, as indicated by area 610. The controller 15 may command a regeneration event when an opportunity presents itself, such as under a steady state driving condition. When the soot loading level is elevated, i.e., is greater than the low soot load level 611 but less than a soot load capacity threshold 613, it indicates that the particulate filter 24 is at a soot loading level that can benefit from an automatic regeneration event, as indicated by area 612. The engine controller 15 can command execution of an automatic regeneration event to effect reduction of soot in the particulate filter 24. When the soot load level is greater than the soot load capacity threshold 613, it indicates that the particulate filter 24 is at an overloaded soot loading level 614. When the particulate filter 24 is in the overloaded soot loading level 614, commanding execution of the automatic regeneration during engine operation may lead to exothermic oxidation of the soot that may cause excess thermal conditions in the exhaust aftertreatment system 20 including the particulate filter 24. As such, executing the automatic regeneration may reduce service life of the particulate filter 24, and should be avoided. As such, the regeneration event is preferably executed in a vehicle service environment by a service technician. When the soot load level is greater than a clogged soot loading level 615, it indicates that the particulate filter 24 is at a clogged soot loading level 616. When the particulate filter 24 is at the clogged soot loading level 616, executing an on-vehicle particulate filter regeneration process may cause unacceptable thermal conditions in the exhaust aftertreatment and the vehicle in general, and should be avoided. As such, when the soot loading level exceeds the clogged soot loading level 615, the suitable mechanism to unclog the particulate filter 24 is to replace the particulate filter 24 with a new device, as indicated by area 616.

Line 620 indicates an initial magnitude of soot loading that can be determined based upon flow resistance for an example particulate filter, and point 622 indicates an initial reading for the soot loading of the example particulate filter.

Line 630 indicates an actual magnitude of soot loading for the example particulate filter when the first, second and third adjustments 302, 402 and 502 are factored in, and point 632 indicates a final reading for the soot loading of the example particulate filter. As such, the initial reading 622 for the soot loading of the example particulate filter indicates that the engine 10 can be controlled in the automatic regeneration mode to regenerate the particulate filter 24, as indicated by area 612.

However, when the initial reading 622 is adjusted with the first, second and third adjustments 302, 402 and 502, the final reading 632 associated with the soot loading level indicates that the suitable mechanism to unclog the particulate filter 24 is to replace the particulate filter 24 with a new device, as indicated by area 616.

Referring again to FIG. 2, the preferred regeneration mode 207 is communicated to the engine controller 15 to command operation of the engine 10 and/or communicate with the vehicle operator (step 208) to convey a course of action for the regeneration. This can include a command to automatically execute a regeneration event during ongoing vehicle operation, a command to illuminate an in-dash lamp or otherwise communicate to the vehicle operator of a need for vehicle service such that the regeneration event can be executed in a vehicle service environment by a service technician, or a command to replace the particulate filter 24 with a new device.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for monitoring a particulate filter disposed in an exhaust aftertreatment system of an internal combustion engine, the method comprising:

determining, via a differential pressure sensor in communication with an engine controller, a pressure differential across the particulate filter;

determining an initial parameter associated with soot loading on the particulate filter based upon the pressure differential via the engine controller;

determining a first adjustment based upon a passive regeneration effect via the engine controller;

determining a second adjustment based upon an off-engine temperature effect via the engine controller, including monitoring an engine soak time and engine temperature, and determining the off-engine temperature effect based thereon;

determining a third adjustment based upon occurrence of an interrupted regeneration event via the engine controller;

determining a final parameter associated with soot loading on the particulate filter based upon the initial parameter and the first, second and third adjustments via the engine controller; and controlling, via the engine controller, a regeneration event for the particulate filter based upon the final parameter associated with soot loading.

2. The method of claim 1, wherein controlling the regeneration event comprises controlling the internal combustion engine to execute auto-regeneration when the final parameter associated with soot loading is less than a soot load capacity threshold.

3. The method of claim 1, wherein controlling the regeneration event comprises controlling the internal combustion engine to execute service regeneration when the final parameter associated with soot loading is greater than a soot load capacity threshold.

4. The method of claim 1, further comprising requesting vehicle service to effect replacement of the particulate filter when the final parameter associated with soot loading is greater than an overloaded soot loading level.

5. The method of claim 1, wherein determining the first adjustment based upon a passive regeneration effect comprises monitoring engine operation to determine a magnitude of NOx emissions and temperature of the particulate filter, and determining the passive regeneration effect based thereon.

6. The method of claim 1, wherein determining the third adjustment based upon occurrence of an interrupted regeneration event comprises monitoring operation for occurrence of an interrupted regeneration event, determining a soot loading level in relation to a pressure differential associated with an interrupted regeneration event, and determining the third adjustment based thereon.

7. A vehicle system, comprising:

an internal combustion engine fluidly coupled to an exhaust aftertreatment system including a particulate filter;

a differential pressure sensor disposed to monitor a differential pressure between a point in an exhaust gas feedstream upstream of the particulate filter and a point in the exhaust gas feedstream downstream of the particulate filter;

a controller, operatively connected to the internal combustion engine and in communication with the differential pressure sensor, the controller including an instruction set, the instruction set executable to:

determine, via the differential pressure sensor, a pressure differential across the particulate filter, determine an initial parameter associated with soot loading on the particulate filter based upon the pressure differential, determine a first adjustment based upon a passive regeneration effect, monitor an engine soak time and engine temperature, determine a second adjustment based upon an off-engine temperature effect based upon the engine soak time and engine temperature, determine a third adjustment based upon occurrence of an interrupted regeneration event, determine a final parameter associated with soot loading on the particulate filter based upon the initial parameter and the first, second and third adjustments, and control a regeneration event for the particulate filter based upon the final parameter associated with soot loading.

8. The vehicle system of claim 7, comprising the instruction set executable to control the internal combustion engine to execute auto-regeneration when the final parameter associated with soot loading is less than a soot load capacity threshold.

9. The vehicle system of claim 7, comprising the instruction set executable to control the internal combustion engine to execute a service regeneration routine when the final parameter associated with soot loading is greater than a soot load capacity threshold.

10. The vehicle system of claim 7, further comprising the instruction set executable to request vehicle service to replace the particulate filter when the final parameter associated with soot loading is greater than an overloaded soot loading level.

11. The vehicle system of claim 7, wherein the instruction set executable to determine the first adjustment based upon a passive regeneration effect comprises the instruction set executable to monitor engine operation to determine a magnitude of NOx emissions and temperature of the particulate filter and determine the passive regeneration effect based thereon.

12. The vehicle system of claim 7, wherein the instruction set executable to determine the third adjustment based upon occurrence of an interrupted regeneration event comprises the instruction set executable to monitor operation for occurrence of an interrupted regeneration event, determine a soot loading level in relation to a pressure differential associated with an interrupted regeneration event, and determine the third adjustment based thereon.

13. A method for monitoring a particulate filter disposed in an exhaust aftertreatment system of an internal combustion engine, the method comprising:

determining, via a differential pressure sensor in communication with an engine controller, a pressure differential across the particulate filter;

determining an initial parameter associated with soot loading on the particulate filter based upon the pressure differential via the engine controller;

determining an effect on the initial parameter based upon passive regeneration of the particulate filter via the engine controller;

determining an effect on the initial parameter based upon off-engine temperature via the engine controller, including monitoring an engine soak time and engine temperature, and determining the effect on the initial parameter based thereon;

determining an effect on the initial parameter based upon occurrence of an interrupted regeneration event via the engine controller;

determining a final parameter associated with soot loading on the particulate filter based upon the initial parameter and the effects on the initial parameter associated with the passive regeneration of the particulate filter, the off-engine temperature, and the occurrence of an interrupted regeneration event via the engine controller; and controlling, via the engine controller, a regeneration event for the particulate filter based upon the final parameter associated with soot loading.

14. The method of claim 13, wherein controlling the regeneration event comprises controlling the internal combustion engine to execute auto-regeneration when the final adjusted soot loading is less than a soot load capacity threshold.

15. The method of claim 14, further comprising controlling the internal combustion engine to execute service regeneration when the final adjusted soot loading is greater than the soot load capacity threshold.

16. The method of claim 15, further comprising commanding, via the controller, vehicle service to replace the particulate filter when the final adjusted soot loading is greater than an overloaded soot loading level.

\* \* \* \* \*